(12) United States Patent
Pirhonen et al.

(10) Patent No.: US 7,881,309 B2
(45) Date of Patent: Feb. 1, 2011

(54) CONTROLLING SERVICE STREAM (75) Inventors: Jouni Pirhonen, Espoo (FI); Vesa Taivalantti, Helsinki (FI); Krisztian Litkey, Espoo (FI); Mika Lindroos, Espoo (FI); Janos Kovacs, Lahela (FI); Esa Sarkama, Helsinki (FI)

(73) Assignee: Nokia Corporation, Espoo (FI)

( * ) Notice: Subject to any disclaimer, the term of this patent is extended or adjusted under 35 U.S.C. 154(b) by 1736 days.

(21) Appl. No.: 10/416,036

(22) PCT Filed: Nov. 6, 2001

(86) PCT No.: PCT/FI01/00964

§ 371 (c)(1),
(2), (4) Date: May 7, 2003

(87) PCT Pub. No.: WO02/39770

PCT Pub. Date: May 16, 2002

(65) Prior Publication Data

US 2004/0028062 A1 Feb. 12, 2004

(30) Foreign Application Priority Data

Nov. 7, 2000 (FI) .................................. 20002437

(51) Int. Cl.
*H04L 12/28* (2006.01)

(52) U.S. Cl. ........................... 370/401; 370/235; 725/87

(58) Field of Classification Search ................. 358/434, 358/468; 370/241, 338, 348, 351, 352, 353, 370/356, 395.52, 390, 392, 395.21, 229, 370/230, 235, 328, 400, 401, 252, 253; 455/63.1; 725/86, 87, 93
See application file for complete search history.

(56) References Cited

U.S. PATENT DOCUMENTS

| 4,727,487 | A | * | 2/1988 | Masui et al. ................... 706/57 |
| 5,058,160 | A |   | 10/1991 | Banker et al. |
| 5,371,852 | A | * | 12/1994 | Attanasio et al. ............ 709/245 |
| 5,548,726 | A | * | 8/1996 | Pettus ......................... 709/221 |
| 5,745,694 | A | * | 4/1998 | Egawa et al. ................. 709/225 |

(Continued)

OTHER PUBLICATIONS

IP Telephone Gateway and Control Protocol thereof, "*Telecommunications Techniques, Issue 8, 1999*", Issue 8, 1999.

(Continued)

*Primary Examiner*—Ricky Ngo
*Assistant Examiner*—Kan Yuen
(74) *Attorney, Agent, or Firm*—Alston & Bird LLP (57) ABSTRACT

When a service is provided in a service stream between end devices controlling the service stream by using first protocol, there is also a need to control the service stream in the network via which the service stream is or is to be transmitted. The service stream is controlled in the network by utilizing first protocol messages which are separated (204) from other traffic transmitted in the network.

18 Claims, 3 Drawing Sheets

U.S. PATENT DOCUMENTS

| | | | |
|---|---|---|---|
| 5,784,463 A * | 7/1998 | Chen et al. | 713/171 |
| 5,790,548 A | 8/1998 | Sistanizadeh et al. | |
| 5,805,804 A * | 9/1998 | Laursen et al. | 709/223 |
| 5,875,180 A * | 2/1999 | Wiedeman et al. | 370/320 |
| 5,966,663 A * | 10/1999 | Gleason | 455/466 |
| 6,084,892 A * | 7/2000 | Benash et al. | 370/401 |
| 6,137,801 A * | 10/2000 | Anderson et al. | 370/400 |
| 6,157,635 A | 12/2000 | Wang et al. | |
| 6,205,149 B1 * | 3/2001 | Lemaire et al. | 370/401 |
| 6,212,359 B1 * | 4/2001 | Knox | 725/135 |
| 6,317,438 B1 * | 11/2001 | Trebes, Jr. | 370/466 |
| 6,408,436 B1 * | 6/2002 | de Haas | 725/86 |
| 6,490,451 B1 * | 12/2002 | Denman et al. | 455/436 |
| 6,535,518 B1 * | 3/2003 | Hu et al. | 370/401 |
| 6,570,851 B1 * | 5/2003 | Koskelainen et al. | 370/231 |
| 6,574,668 B1 * | 6/2003 | Gubbi et al. | 709/237 |
| 6,600,735 B1 * | 7/2003 | Iwama et al. | 370/352 |
| 6,674,756 B1 * | 1/2004 | Rao et al. | 370/395.21 |
| 6,683,881 B1 * | 1/2004 | Mijares et al. | 370/401 |
| 6,795,443 B1 * | 9/2004 | Jeong et al. | 370/395.5 |
| 6,819,673 B1 * | 11/2004 | Giroir et al. | 370/400 |
| 6,819,750 B1 * | 11/2004 | Mehta et al. | 379/100.17 |
| 6,879,587 B1 * | 4/2005 | Yadav et al. | 370/389 |
| 6,910,024 B2 | 6/2005 | Krishnamurthy et al. | |
| 6,914,907 B1 * | 7/2005 | Bhardwaj et al. | 370/432 |
| 6,978,381 B1 * | 12/2005 | Te et al. | 726/18 |
| 7,006,472 B1 * | 2/2006 | Immonen et al. | 370/332 |
| 7,028,335 B1 * | 4/2006 | Borella et al. | 726/11 |
| 7,068,632 B1 * | 6/2006 | Ho et al. | 370/338 |
| 7,444,398 B1 * | 10/2008 | Matthews | 709/224 |
| 2001/0025310 A1 * | 9/2001 | Krishnamurthy et al. | 709/223 |

OTHER PUBLICATIONS

Analysis of QoS Router Key Technique, *"Computer Engineering"*, Issue 12, 1999.

* cited by examiner

CONTROLLING SERVICE STREAM

FIELD OF THE INVENTION

The present invention relates to services relayed to a subscriber in service streams from another subscriber or a server via a network, and particularly to services-on-demand controlled by the subscriber.

BACKGROUND OF THE INVENTION

Continuously advancing networks enable a variety of services to be developed. Among these services services are various services which have been implemented to be used by a subscriber when desired, such as a video-on-demand, for example. These services are also called services-on-demand. The basic structure of this kind of service is that the subscriber uses his/her equipment to send commands via a network to a server offering the service and the server acts according to the commands received and, for example, starts to transmit a selected video in a service stream from the server to the subscriber equipment via the network. The quality of the service, the protocol used and the bandwidth the service requires in the network are negotiated between the server and the end customer and, on the basis of the negotiations, a pipe is formed via which the service stream is transmitted.

A problem with the above described arrangement is that the network has no means to control the service stream. The traffic management in the network is totally dependent on solutions made by server vendors.

DISCLOSURE OF THE INVENTION

The object of the invention is to overcome the above stated problem. This object is achieved with a method, a system, a network and network nodes characterized by what is disclosed in the independent claims. The preferred embodiments of the invention are set forth in the dependent claims.

The invention is based on utilizing service control messages sent between end devices, such as a subscriber equipment and a server, to control the service stream in the network. For controlling the service stream, at least one service gateway function and at least one adapted router function is added to the network. The router function is adapted to pass through the service stream and to forward the service control messages, such as commands sent by the subscriber equipment, to the service gateway function. The service gateway function processes the received service control message and the information included in the message when the service control message relates to a service stream. In other words intelligence is separated from the relaying.

The advantage of the invention is that the network can now control the service stream and thereby for example control the bandwidth, guarantee quality of service and collect log information to be used for charging, for example. A further advantage is that since packet forwarding is separated from processing of the service control messages, service streams are not delayed.

In an embodiment of the invention the adapted router function is preferably in every router located at the edge of the network, and the service gateway function is centralized so that there are only a few nodes (or one node) comprising the service gateway function. Yet another advantage of this embodiment is that the network operator needs only a few expensive intelligent service gateways where to centralize the intelligence needed for controlling the service streams whereas the inexpensive and "simple" adapted routers ensure that the traffic runs smoothly without bottlenecks.

In another embodiment of the invention the adapted router function and the service gateway function are in the same network node. A further advantage of this embodiment is that only minimum changes to the network are needed and yet the advantages of the embodiment are achieved.

BRIEF DESCRIPTION OF THE FIGURES

The invention will be described in further detail in the following by means of preferred embodiments with reference to the accompanying drawings, in which.

DETAILED DESCRIPTION OF THE INVENTION

The present invention is applicable to any communications system where service control messages used between two end devices, such as a subscriber equipment and a server, can be separated from the service stream they control. The present invention is particularly well applicable to systems where the subscriber equipment, also called as a 'client', and the server providing the service to the subscriber are using IP-based (Internet Protocol) protocols. The invention will be described in the following using the Video-on-demand service and its control protocol RTSP (Real Time Streaming Protocol) as an example, but the invention is not limited to such a system. Another example is voice over IP service, such as IP Telephony, where the service control protocol can be SIP (Session Initiation Protocol). Yet another example is multicast service using IGMP (Internet Group Management Protocol), for example. The definitions of telecommunications systems evolve rapidly, which may necessitate additional changes to the invention. For this reason, all the terms and expressions should be interpreted broadly, and it should also be kept in mind that they are only intended to describe the invention, not to limit it.

Figure 1:
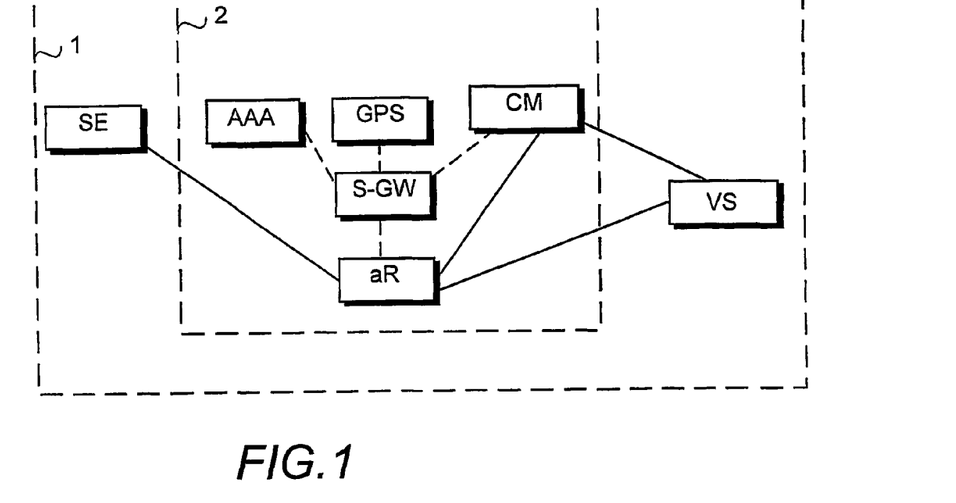
FIG. 1 is a block diagram illustrating a system according to a first preferred embodiment of the invention.

FIG. 1 shows a simplified network architecture according to a first preferred embodiment of the invention, describing only some of the elements of a system architecture. The network nodes illustrated in FIG. 1 are logical units, the implementation of which may differ from the one described. It is obvious to one skilled in the art that the system may also comprise other functions and structures which need not be described in closer detail here. The broken lines in FIG. 1 between network nodes denote signalling connections while the unbroken lines denote signalling and data transmission connections.

The system 1 comprises a subscriber equipment SE, a video server VS and a network 2 via which the video-on-demand service is transmitted between the subscriber equipment SE and the video server VS. The subscriber equipment SE and the video server VS represent here the end devices. An end device is an entity that is capable of sending and/or receiving information packets, i.e. service streams, and has a unique device address. An end device can act either as a client or a server within giveg context or across multiple contexts. For example, an end device can serve a number of clients (as a server) while being a client to another server.

For the sake of clarity, the term 'subscriber equipment' as used herein includes both a subscriber equipment via which the video services are provided to the user of the equipment and the user giving instructions to the video server via the subscriber equipment and the network. For the sake of clarity it is also assumed that the user is also the subscriber. The subscriber equipment covers here the actual combination of single equipments needed to provide the service-on-demand. The subscriber equipment may comprise a set top box connected to a reproduction device, such as a television, and a remote controller, for example. Another examples of a subscriber equipment are a personal computer, a PDA (Personal Digital Assistant) and a mobile station. User commands are transmitted from the subscriber equipment to the video server VS, as far as they require actions to be taken by the video server VS.

A plurality of video programs are stored on the video server VS. From the subscriber's and subscriber equipment's point of view the video server VS behaves as a remote video recorder. The stored programs can be played, played back at various speeds, paused and resumed, for example.

The subscriber equipment controls the service by sending control messages according to the RTSP protocol and the server delivers the selected video program as a service stream formed of IP packets.

The network 2 can be a network of any kind of telecommunications system. It can be a fixed system, such as the PSTN (Public Switch Telephone Network) or a mobile communication system, such as a 'third-generation mobile communication system' UMTS (Universal Mobile Telecommunications System) or the Pan-European mobile communications system GSM (Global System for Mobile Communications), preferably one offering the General Packet Radio Service GPRS. Thus, the network 2 can be any network capable of transmit IP packets: an ethernet, a cable modem network, an ATM (Asynchronous Transfer Mode) network, an ADSL (Asynchronous Digital Subscriber Line) network, a VDSL (Very high speed Digital Subscriber Line) network, or a 3GPP AII-IP network, for example. The 3GPP AII-IP network is an UMTS system network based on IP technology and specified in a 3GPP ($3^{rd}$ generation partnership project).

In the example illustrated in FIG. 1, the network 2 comprises an AAA (Authorization, Authentication, Accounting) server AAA, a global policy server GPS, a cache CM, a service gateway S-GW and an adapted router aR.

Figure 3:
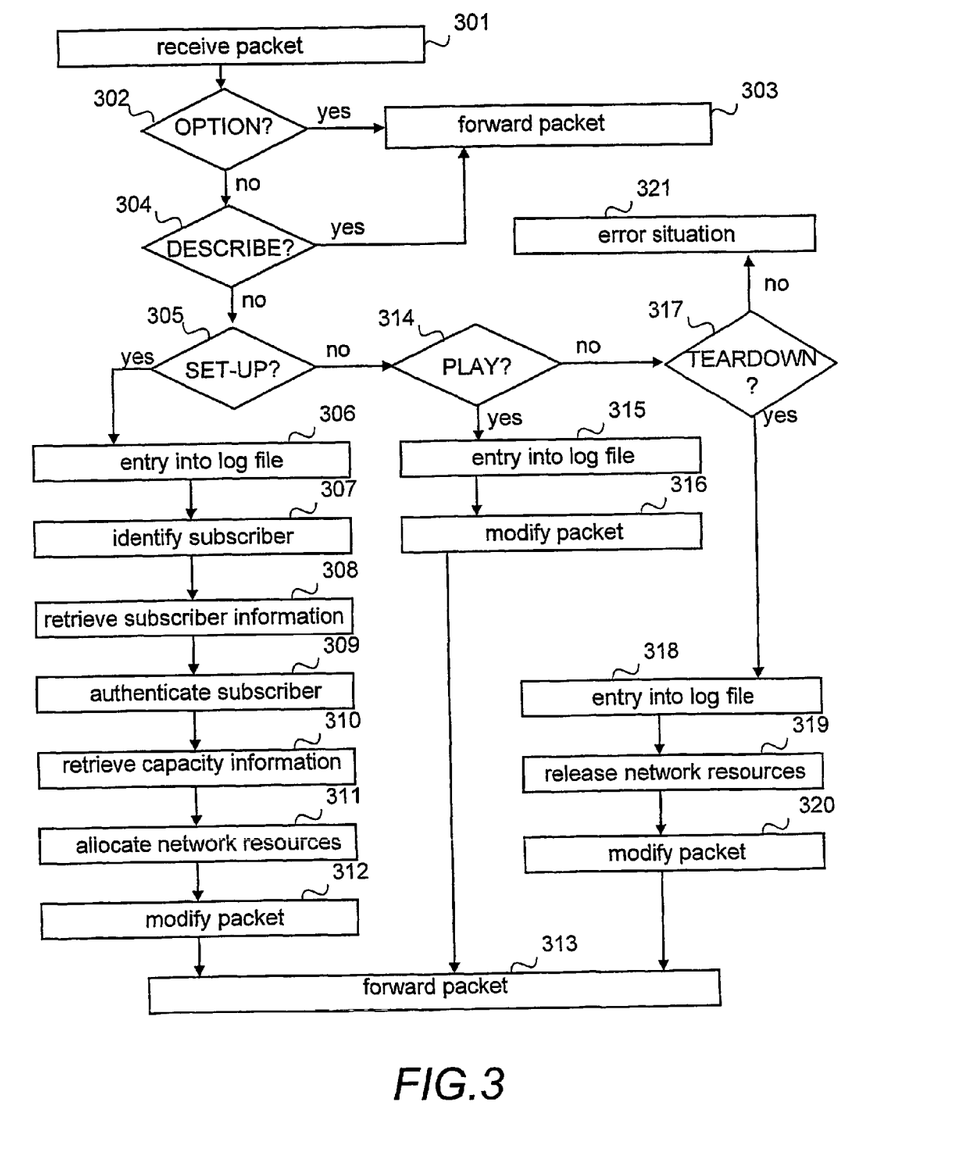
FIG. 3 is a flow chart illustrating the functionality of a service gateway according to a second preferred embodiment of the invention.
Figure 4:
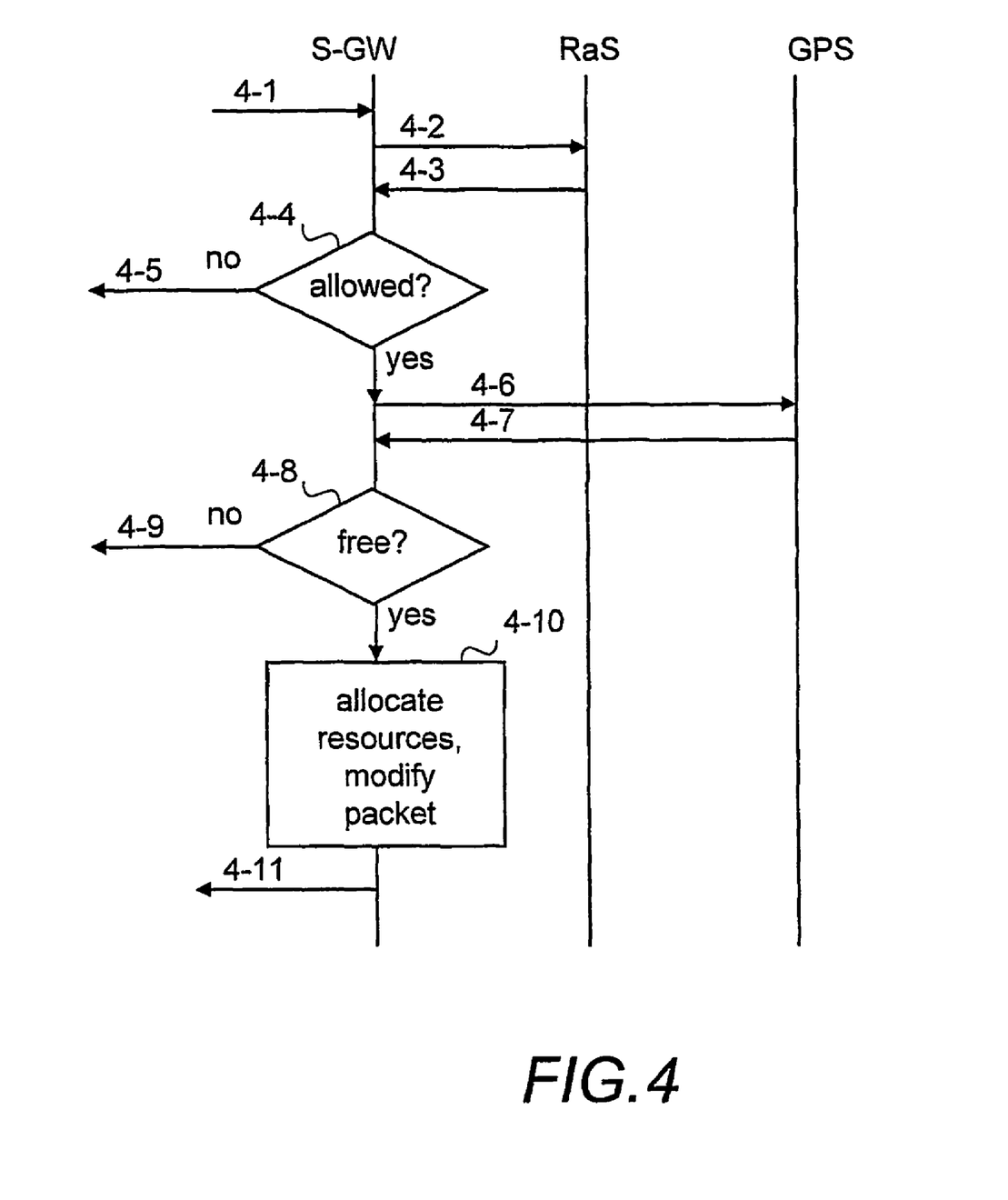
FIG. 4 is a signalling chart illustrating signalling to which the service gateway participates during service set-up in the second preferred embodiment of the invention.

The AAA server AAA comprises subscriber information which can be used during authentication and network resource allocation described in greater detail in FIGS. 3 and 4. In the first preferred embodiment of the invention the AAA server also collects billing information for example for charging the subscriber and/or the service provider on the basis of the actual usage of the network. In prior art systems there is no mechanism to charge on the basis of the actual usage but the charging is usually based on a flat monthly rate. Thus the controlling of the service stream enables the network operator to receive revenue from service delivery. The AAA server may correspond to a home location server or a visitor location server of the GSM system, or it may be based on an LDAP (Lightweight Directory Access Protocol) or it can be an application specific server, a DIAMETER server or a RADIUS server, for example.

The global policy server GPS monitors the traffic in the whole network 2. The GPS provides information for resource allocation to be described in greater detail in FIGS. 3 and 4.

The cache CM is used to store some of the most popular video programs in order to minimize the load on the video server VS. When the selected video program is in the cache CM, the video program is sent to the subscriber equipment SE from the cache, not from the video server VS, i.e. the service stream is between the cache CM and the subscriber equipment SE. Thus the cache CM can also be considered an end device.

The adapted router aR is a network node comprising at least the adapted router function. The adapted router aR handles traffic and in the first preferred embodiment takes care that all RTSP IP packets are transmitted via the service gateway S-GW, but the service stream and other traffic, if any, is passed towards the destination address. The adapted router aR may also be instructed to forward other protocols to certain addresses, e.g. instructed to forward only UDP streams to the cache. The adapted router functionality according to the invention is described in greater detail in FIG. 2.

The service gateway S-GW is a network node comprising at least the service gateway function. The service gateway S-GW is a point where the service stream is controlled, i.e. where the bandwidth and thereby the quality of service is allocated and managed, proper service stream format is selected and log information is collected in the first preferred embodiment of the invention. The service stream control is based on processing the service control messages. In the first preferred embodiment of the invention, the service stream control also includes the controlling of the cache operations, such as when to start or stop the sending of service streams. The service gateway S-GW also controls the adapted router aR via API (Application Program Interface), CORBA (Common Object Request Broker Architecture), RPC (Remote Procedure Call), Java, SOAP (Simple Object Access Protocol) or a protocol defined for the information exchange between the adapted router aR and the service gateway S-GW, for example. The service gateway functionality is described in greater detail in FIGS. 3 and 4.

In the first and second preferred embodiments of the invention the adapter router aR is not necessarily an edge element of the network 2. In other words, it can receive the service stream and service control messages from a node in the network 2 and send them to another node in the network 2.

In the third preferred embodiment of the invention the edge elements of the network 2 are adapted routers aR. In other words, the traffic including service control messages and service streams enters the network 2 via an adapted router aR and exits the network 2 via another adapted router aR. Depending on the network architecture and the load, the network 2 comprises one or more service gateways S-GW to which the control of service streams is centralized.

The system implementing the functionality of the present invention and the network nodes of the system comprise not only prior art means, but also means for implementing the functions described in greater detail in connection with FIGS. 2, 3 and 4. More specifically, they comprise means for separating service control messages from the traffic and processing the service control messages so that the service stream can be controlled and/or monitored in the network. The present network nodes comprise processors and memory that can be utilized in the functions of the invention. All changes needed for implementing the invention can be accomplished as added or updated software routines, using application specific integrated circuits (ASIC) and/or programmable circuits, such as EPLD, FPGA. The invention may also be implemented by adding at least one new network node comprising both an adaptive router function and a service gateway function, or by adding the adapted router function to one or more existing and/or new network nodes and the service gateway function to at least one network node.

Figure 2:
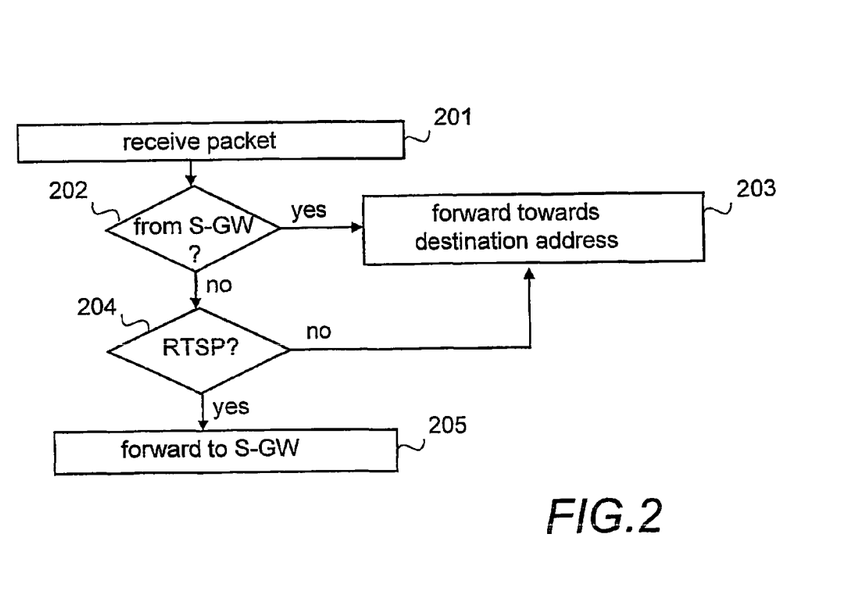
FIG. 2 is a flow chart illustrating the functionality of a router according to the first preferred embodiment of the invention.

FIG. 2 illustrates the functionality of the adapted router aR in the first preferred embodiment of the invention. The example shown in FIG. 2 assumes that the service is controlled only by the RTSP protocol and the adapter router aR has no other routing instructions.

Referring to FIG. 2, the adapted router receives a packet in step 201 and checks, in step 202, if the packet was received from the service gateway S-GW. If yes, then the adapted router forwards, in step 203, the packet towards its destination address.

If the packet was not received from the service gateway S-GW (step 202), the adapted router checks, in step 204, if the packet relates to an RTSP message. (A packet contains an encapsulated message or part of a message depending on the sizes of the message and the packet). In other words, it checks, whether the packet is relates to service control. If yes, the adapted router forwards, in step 205, the packet (and the message encapsulated in the packet) to the service gateway S-GW.

If the packet is not an RTSP packet (step 204), the adapted router proceeds to step 203 and forwards the packet towards its destination address.

Thus, the adapted router intercepts the service control packets from the service stream and other traffic in the network, e.g. packets relating to connection establishment in the transmission network, and forwards only the packets relating to service control to the service gateway. By operating like this the adapter router hides the access technique dependencies from the serving gateway S-GW, such as the protocol used in the network, the protocol used to compress the video program and proprietory-dependent server features, if any. Thus the arrangement allows different servers of different vendors and/or different protocols and/or different kinds of service streams, such as video, games, music, etc., to be used in the system.

In the third preferred embodiment of the invention the adapted router checks in step 202, if the packet was received from the network. In other words the adapted router checks, if the packet is exiting the network. If so, the adapted router proceeds to step 203 to forward the packet. If the packet was not received form the network, it is a packet entering the network and the adapted router proceeds to step 204 to check whether the packet relates to an RSTP message. Thus the service control messages are forwarded to the service gateway comprising the intelligence and the service streams and other traffic are forwarded towards their destination.

In some embodiments of the invention there may be some other routing instructions besides the instruction 'forward RTSP packets via S-GW'. In these embodiments, when a packet is received which is not coming from the service gateway and which is not an RTSP packet, the router checks (after step 204), if the packet is of a packet type having a specified routing instruction, and if it is, the adapted router forwards the packet according to the specified routing instruction relating to this type of packet. The specified routing instructions can be set dynamically by the service gateway and/or by system management, e.g. according to load situation in the network or according to clients' characteristics.

FIG. 3 illustrates the functionality of the service gateway S-GW in the second preferred embodiment of the invention. In the second preferred embodiment of the invention there is no cache in the system and the service stream originates always from the server. For clarity's sake, the example shown in FIG. 3 assumes that the service is controlled by the RTSP protocol and the service control messages used are 'OPTION', 'DESCRIBE', 'SET-UP', 'PLAY' and 'TEAR-DOWN'. It is also assumed, for clarity's sake, that one message is transmitted in one packet, so that receiving and sending a message corresponds to receiving and sending a packet into which the message is encapsulated.

In FIG. 3, the S-GW receives a message in step 301. The S-GW checks, in step 302, if the message is an 'OPTION'. If it is, the S-GW forwards, in step 303, the message towards its destination address by sending the message to the adapted router. If the message is not an 'OPTION', the S-GW checks, in step 304, if the message is a 'DESCRIBE'. If it is, the S-GW proceeds to step 303 to forward the message towards its destination address.

The service control messages 'OPTION' and 'DESCRIBE' illustrate here service protocol messages which are not related to the service stream. The service gateway S-GW simply passes this kind of service control messages without processing them any further than just by checking the type of the message.

If the message is not a 'DESCRIBE', the S-GW checks, in step 305, if it is a 'SET-UP'. If it is, the S-GW makes, in step 306, an entry into a log file stored preferably in the S-GW identifies, in step 307, the subscriber on the basis of the information in the 'SET-UP' message, and retrieves, in step 308, subscriber information from the AM server. The S-GW then authenticates the subscriber in step 309. In the example shown in FIG. 3 it is assumed that the authentication and authorization succeed and the subscriber is allowed to use the services. After the subscriber is authenticated and authorized, the S-GW retrieves, in step 310, from the global policy server information of the capacity available in the network. In other words, it checks how loaded the network is. The S-GW then allocates, in step 311, network resources for the service stream on the basis of service parameters included in the 'SET-UP' message, the subscriber profile in the subscriber information retrieved in step 308 and the capacity available in the network. The 'SET-UP' message includes parameters indicating for example the desired bandwidth, preferred coding etc. The subscriber profile may indicate if the end device is a set-top box to which service streams can be sent using a wide bandwidth, or a mobile terminal with a narrower bandwidth. The network capacity indicates how much there is free bandwidth, for example. Also other factors affecting the needed bandwidth and/or network load can be taken into consideration when allocating resources, or the network resources may be allocated on the basis of only one or two of the above mentioned factors. After the network resources are allocated, the S-GW modifies, in step 312, the RTSP message to correspond to the allocated network resources and forwards, in step 313, the modified message towards its destination address via the adapted router. If there are several video servers, the service gateway may also select the proper server during network resource allocation although the subscriber had requested the video from a certain server. The selection of the proper server can be based on, for example, load balancing between servers or on standards supported by the video servers and/or characteristics of the end terminal. If the proper server is not the same as the pointed server, also the address of the server in the message has to be modified.

If the message is not a 'SET-UP' packet, the S-GW checks, in step 314, if it is a 'PLAY' message. If it is, the S-GW makes, in step 315, an entry into the log file and modifies, in step 316, the message to correspond the characteristics of the service stream, if modification is needed. After modifying the message the S-GW proceeds to step 313 to forward the message towards its destination address.

If the packet is not a 'PLAY' message, the S-GW checks, in step 317, if it is a 'TEARDOWN' message. If it is, the S-GW makes, in step 318, an entry into the log file, releases resource allocations for this service stream in step 319 and modifies, in step 320, the message to correspond to the characteristics of the service stream, if modification is needed. After modifying the message the S-GW proceeds to step 313 to forward the message towards its destination address.

If the message is not a 'TEARDOWN' message (step 317), an error situation is detected in step 321 and the S-GW proceeds according to predetermined instructions relating to the error situation in question. For example, the S-GW may raise an alarm and/or make an entry into the log file.

The collected log information can be used for network engineering purposes or for charging based on the actual use of services, for example.

In embodiments where the network operator of the network does not want to authenticate the subscriber, step 309 where the subscriber authentication takes place, is skipped.

In embodiments where the system comprises a cache, the S-GW checks, during the processing of the 'SET-UP' packet, if the video program selected by the subscriber is in the cache. The result of this checking may influence the network resource allocation. The cache check is performed preferably after subscriber authentication. If the video is in the cache, the service stream is controlled to be between the cache and the subscriber, so the S-GW changes the addresses in the address fields of the 'SET-UP', 'PLAY' and 'TEARDOWN' messages, the address field indicating the origin of the service stream as the address of the cache. If the video is not in the cache, the service stream passes through the cache.

As can be seen from the above, the end devices do not notice at all that the messages are processed by the service gateway. If the service gateway changes the parameters, the end devices both assume that the parameters are sent by the other end device. By changing the parameters the service gateway can guarantee a service level according to the changed parameters in the network where the service gateway is located. If there are two or more different networks between the end devices, the service gateway in the first network controls the stream in the first network, the second service gateway controls the stream in the second network, etc. In other words, the service stream pipe between end devices is divided into subpipes, each network having its own subpipe, the service level of which is determined so that also the characteristics of the network are taken into consideration. Thus the end-to-end service level can be guaranteed by guaranteeing edge-to-edge service levels in the networks.

The steps shown in FIGS. 2 and 3 are not in an absolute chronological order. For example, some of the above described steps may take place simultaneously, or in another order. Some steps may be skipped, such as steps 316 and 320 in FIG. 3 where the message is modified. In other words, the messages are modified only if the parameters included in the original message are changed by the S-GW during set-up. Correspondingly, other steps not shown in FIGS. 2 and 3 may take place between the above mentioned steps. For example, a session is created in response to a 'SET-UP' packet and deleted in response to a 'TEARDOWN' packet.

FIG. 4 shows signalling according to the second preferred embodiment of the invention where the serving gateway S-GW receives an RTSP message 'SET-UP' in message 4-1. In response to message 4-1, the service gateway S-GW sends message 4-2 to the server AAA requesting subscriber information. The server AAA sends the subscriber information to the service gateway S-GW in message 4-3. The service gateway S-GW then authenticates and authorizes the subscriber, i.e. it checks, in point 4-4, if the subscriber is allowed to use service. If the user is not, the service gateway S-GW rejects the set up by sending message 4-5.

If the user is authorized to use the services, the service gateway S-GW sends message 4-6 to the global policy server GPS requesting information on resources available in the network. The global policy server GPS sends the requested information in message 4-7 to the service gateway S-GW. The service gateway S-GW then checks, in point 4-8, if there is enough free capacity to support the requested service stream. If there is not, the service gateway S-GW rejects the set up by sending message 4-9.

If there is enough free capacity, the service gateway S-GW allocates, in point 4-10, resources to the service stream and modifies the message, as described earlier in FIG. 3, and then sends the message towards its destination in message 4-11.

The signalling messages and points shown in FIG. 4 are not in absolute chronological order and they can be carried out in different order from the given one. Other signalling messages can be transmitted and/or other functions can also be carried out between the messages and/or points. The signalling messages are only examples and may comprise several separate messages for transmitting the same information. In addition, the messages may also comprise other information.

Although the invention has been described above in connection with only one service control protocol, it is obvious to one skilled in the art that the invention can also be applied in connection with several different service protocols.

Although the invention has been described above in connection with client-server communication, it is obvious to one skilled in the art that the invention can also be applied in connection with peer-to-peer communication and in connection with party-to-party communication and in other connections where service control messages can be sent from both of the end devices and/or the service control messages controls two or more service streams sent between the end devices.

The accompanying drawings and the description pertaining to them are only intended to illustrate the present invention. Different variations and modifications to the invention will be apparent to those skilled in the art, without departing from the scope and spirit of the invention defined in the appended claims.

The invention claimed is:

1. A method, comprising:
controlling an on-demand-service between a first and a second end device by using a first protocol, a first protocol message having a destination address indicating the first or the second end device, wherein controlling comprises managing bandwidth;
selecting a correct first end device among at least two first end devices during service set-up;
causing delivery of the service to a second end device from the correct first end device in a service stream via a network;
receiving first protocol messages separated from other traffic received from the network;
controlling the service stream in the transmitting network by using the separated first protocol messages;
causing the first protocol messages used in controlling the service stream to be forwarded towards the respective destination addresses of the messages; causing traffic other than the first protocol message to pass toward the respective destination address;

recognizing the first protocol message relating to on-demand-service stream set-up;
determining requested resources indicated in the first protocol message;
determining resources available in the network;
allocating network resources to the on-demand-service stream based on the requested and available resources; and
modifying the requested network resources indicated in the first protocol message before forwarding the message, when the allocated resources are not the same as the requested resources.

2. The method of claim 1, further comprising:
maintaining a service gateway configured to control service streams in the network; and
circulating the first protocol messages via the service gateway.

3. A system, comprising:
at least two first end devices configured to provide an on-demand-service in a service stream;
a second end device configured to receive the service;
a first protocol used by the end devices to control the service stream, a first protocol message having a destination address indicating the first or the second end device; and
a network via which the service stream is transmitted, wherein the network comprises a service gateway configured to select a correct first end device among the at least two first end devices during service set-up, and control an on-demand-service by managing bandwidth,
a router configured to separate the first protocol messages from traffic received via the network and to forward the first protocol messages to the service gateway, the router being further configured to pass traffic other than first control packets toward the respective destination address; and
the service gateway being further configured to:
process the received first protocol messages in order to control the service stream in the network and after processing a first protocol message, to forward it towards its destination address;
recognize the first protocol message relating to on-demand-service stream set-up;
determine requested resources indicated in the first protocol message;
determine resources available in the network;
allocate network resources to the on-demand-service stream based on the requested and available resources; and
modify the requested network resources indicated in the first protocol message before forwarding the message, when the allocated resources are not the same as the requested resources.

4. A network, comprising:
a service gateway configured to process first protocol messages used by a first end device and a second end device to control an on-demand service provided in a service stream between the first end device and the second end device in the network, the first protocol messages having a destination address indicating the first or the second end device, and to select a correct first end device among at least two first end devices during service set-up, wherein the controlling comprises managing bandwidth; and
a router configured to receive traffic from a network, to separate the first protocol messages from, the received traffic and to forward the first protocol messages to the service gateway, the router being further configured to pass traffic other than first control packets toward the respective destination address,
wherein the service gateway is further configured to:
forward the first protocol messages used in controlling the service stream toward the respective destination address of the messages;
recognize the first protocol message relating to on-demand-service stream set-up;
determine requested resources indicated in the first protocol message;
determine resources available in the network;
allocate network resources to the on-demand-service stream based on the requested and available resources; and
modify the requested network resources indicated in the first protocol message before forwarding the message, when the allocated resources are not the same as the requested resources.

5. The network of claim 4, wherein the service gateway is configured to process the first protocol messages according to message type.

6. The network of claim 5, wherein the service gateway is configured to pass those first protocol messages that do not relate to said service stream and to collect log information on messages relating to said service stream.

7. The network of claim 4, wherein the service gateway is further configured to allocate network resources to the service stream based on requested resources indicated in the first control message and based on the network load.

8. The network of claim 4, wherein the router and the service gateway are located in a same physical network node.

9. An apparatus comprising at least one processor and at least one memory including instructions, the at least one memory and the instructions configured to, with the at least one processor, cause the apparatus at least to:
control an on-demand-service provided in a service stream via a network by using first protocol messages used to control the service between end devices, the first protocol messages having a destination address indicating the first or the second end device, wherein the controlling comprises managing bandwidth;
select a correct first end device among at least two first end devices during service set-up;
cause delivery of the service to a second end device from the correct first end device in a service stream via a network;
receive first protocol messages separated from other traffic received from the network;
control the service stream in the transmitting network by using the separated first Protocol messages;
cause the first protocol messages used in controlling the service stream to be forwarded towards the respective destination addresses of the messages;
cause traffic other than the first protocol message to pass toward the respective destination address;
recognize the first protocol message relating to on-demand-service stream set-up;
determine requested resources indicated in the first protocol message;
determine resources available in the network;
allocate network resources to the on-demand-service stream based on the requested and available resources; and modify the requested network resources indicated in the first protocol message before forwarding the message, when the allocated resources are not the same as the requested resources.

10. The apparatus of claim 9, wherein the apparatus is further caused to authenticate an end device during service stream set-up.

11. The apparatus of claim 9, wherein the apparatus is further caused to allocate network resources for the service stream based on requested resources indicated in the first protocol message and based on the network load.

12. The apparatus of claim 9, wherein the apparatus is further caused to allocate network resources for the service stream based on the subscriber profile of a subscriber requesting the service.

13. The apparatus of claim 9, wherein the apparatus is further caused to collect charging information based on first protocol messages.

14. An apparatus comprising at least one processor and at least one memory including computer program code, the at least one memory and the computer program code configured to, with, the at least one processor, cause the apparatus at least to:
separate, from traffic received via a network, first control packets used to control an on-demand-service between a first and a second end device, the first control packets having a destination address indicating the first or the second end device and the first protocol packets being streaming protocol packets, the controlling comprising managing bandwidth;
cause the first control packets to be forwarded according to routing instructions defined for the first control packets regardless of the destination address of the first control packets; and
cause traffic other than the first control packets to pass toward a respective destination address;
wherein the routine instructions defined for the first control packets are configured to cause least one of first control packets, which is not received from a service gateway function, to be forwarded to the service gateway function and cause the at least one first control packet received from the service gateway function to be forwarded towards its destination address.

15. An apparatus according to claim 14, wherein the apparatus is an edge element for transmitting traffic from and to a network.

16. A method, comprising:
separating, from traffic received via a network, first control packets used to control an on-demand-service between a first and a second end device, the first control packets having a destination address indicating the first or the second end device and the first protocol packets being streaming protocol packets, wherein controlling comprises managing bandwidth;
causing the first control packets to be forwarded according to routing instructions defined for the first control packets regardless of the destination address of the first control packets; and
causing traffic other than the first control packets to pass toward a respective destination address;
wherein the routing instructions defined for the first control packets are configured to cause first control packets that are not received from a service gateway function to be forwarded to the service gateway function, and causing first control packets that are received from the service gateway function to be forwarded towards its destination address.

17. A method according to claim 16, wherein the routing instructions defined for the first control packets are configured to cause a first control packet, which is not received from a service gateway function, to be forwarded to the service gateway function and causing a first control packet received from the service gateway function to be forwarded towards its destination address.

18. A non-transitory computer-readable medium, encoded with instructions that, when executed on a computer, perform a process, the process comprising:
separating, from traffic received via a network, first control packets used to control an on-demand-service between a first and a second end device, the first control packets having a destination address indicating the first or the second end device and the first protocol packets being streaming protocol packets, wherein controlling comprises managing bandwidth;
causing the first control packets to be forwarded according to routing instructions defined for the first control packets regardless of the destination address of the first control packets;
causing traffic other than the first control packets to pass toward a respective destination address; and
wherein the routing instructions defined for the first control packets are configured to cause first control packets that are not received from a service gateway function to be forwarded to the service gateway function, and causing first control packets that are received from the service gateway function be forwarded towards its destination address.

* * * * *

UNITED STATES PATENT AND TRADEMARK OFFICE
CERTIFICATE OF CORRECTION

PATENT NO. : 7,881,309 B2  Page 1 of 1
APPLICATION NO. : 10/416036
DATED : February 1, 2011
INVENTOR(S) : Pirhonen et al.

It is certified that error appears in the above-identified patent and that said Letters Patent is hereby corrected as shown below:

Column 11,
Line 37, "routine" should read --routing--;
Line 38, "cause least one of" should read --cause at least one of the--.

Signed and Sealed this
Eleventh Day of September, 2012

David J. Kappos
*Director of the United States Patent and Trademark Office*